(12) United States Patent
Conrad et al.

(10) Patent No.: US 12,076,904 B2
(45) Date of Patent: Sep. 3, 2024

(54) DEVICE AND METHOD FOR PRODUCING A DYED AND AN UNDYED PLASTIC MELT

(71) Applicant: Coperion GmbH, Stuttgart (DE)

(72) Inventors: Ulrich Conrad, Elze (DE); Norbert Kern, Tamm (DE); Markus Schmudde, Murr (DE); Bernhard Stöhrer, Pleidelsheim (DE); Heiko Hornberger, Hessigheim (DE)

(73) Assignee: Coperion GmbH, Stuttgart (DE)

( * ) Notice: Subject to any disclaimer, the term of this patent is extended or adjusted under 35 U.S.C. 154(b) by 1029 days.

(21) Appl. No.: 16/325,999

(22) PCT Filed: Jul. 27, 2017

(86) PCT No.: PCT/EP2017/068947
§ 371 (c)(1),
(2) Date: Feb. 15, 2019

(87) PCT Pub. No.: WO2018/033353
PCT Pub. Date: Feb. 22, 2018

(65) Prior Publication Data
US 2020/0139606 A1    May 7, 2020

(30) Foreign Application Priority Data

Aug. 17, 2016   (EP) .................................... 16184547

(51) Int. Cl.
*B29C 48/00*    (2019.01)
*B29B 7/00*    (2006.01)
(Continued)

(52) U.S. Cl.
CPC ............ *B29C 48/385* (2019.02); *B29B 7/484* (2013.01); *B29B 7/487* (2013.01); *B29B 7/489* (2013.01);
(Continued)

(58) Field of Classification Search
CPC .......... B29B 7/72; B29C 48/38; B29C 48/385
See application file for complete search history.

(56) References Cited

U.S. PATENT DOCUMENTS 3,146,493 A * 9/1964 Steinle .................... B29B 7/748
366/82
5,053,176 A   10/1991 Cameron et al.
(Continued)

FOREIGN PATENT DOCUMENTS

DE    10 2004 002 401 A1    8/2005
DE    10 2007 050681 A1    4/2009
(Continued)

OTHER PUBLICATIONS

Groger, Ali. "Modelling of Counter Rotating Twin Screw Extrusion." McMaster University, 2013, macsphere.mcmaster.ca/bitstream/11375/13375/1/fulltext.pdf. (Year: 2013).*
(Continued)

*Primary Examiner* — Seyed Masoud Malekzadeh
*Assistant Examiner* — Andres E. Behrens, Jr.
(74) *Attorney, Agent, or Firm* — Dinsmore & Shohl LLP (57) ABSTRACT

A device for producing a dyed plastic melt and an undyed plastic melt includes a multi-shaft screw extruder, a first metering installation, a second metering installation, and a control installation, selecting between a first operating mode for producing the dyed plastic melt and a second operating mode for producing the undyed plastic melt. The first metering installation feeds an undyed plastic material through a first infeed opening into a housing of the multi-shaft screw extruder, and the second metering installation feeds at least one dyeing agent through a second infeed opening into the housing. In order for the undyed plastic melt to be produced, the plastic material is fed exclusively via the first infeed opening such that residual dyeing agent which is still located in the second metering installation or (Continued)

in the region of the second infeed opening does not contaminate the undyed plastic melt.

27 Claims, 7 Drawing Sheets

(51) Int. Cl.
    *B29B 7/48*     (2006.01)
    *B29B 7/60*     (2006.01)
    *B29B 7/72*     (2006.01)
    *B29B 7/88*     (2006.01)
    *B29C 48/285*     (2019.01)
    *B29C 48/385*     (2019.01)
    *B29C 48/92*     (2019.01)

(52) U.S. Cl.
    CPC ............... *B29B 7/603* (2013.01); *B29B 7/72* (2013.01); *B29B 7/88* (2013.01); *B29C 48/285* (2019.02); *B29C 2948/92009* (2019.02); *B29C 2948/92828* (2019.02)

(56) References Cited

U.S. PATENT DOCUMENTS

| | | | | |
|---|---|---|---|---|
| 5,232,960 | A * | 8/1993 | Wagner | B29B 7/603 |
| | | | | 523/435 |
| 11,273,576 | B2 * | 3/2022 | Conrad | F26B 17/00 |
| 11,440,221 | B2 * | 9/2022 | Conrad | B29C 48/2715 |
| 2003/0098978 | A1 * | 5/2003 | Ikeda | B07C 5/3425 |
| | | | | 356/406 |
| 2006/0057266 | A1 * | 3/2006 | Meyer | A23P 30/25 |
| | | | | 426/516 |
| 2008/0093763 | A1 * | 4/2008 | Mancosh | B29C 48/67 |
| | | | | 264/211 |
| 2009/0127733 | A1 * | 5/2009 | Takita | C08J 5/18 |
| | | | | 264/211 |
| 2015/0087733 | A1 * | 3/2015 | Heusser | B29C 48/385 |
| | | | | 521/79 |
| 2016/0214277 | A1 | 7/2016 | Saga et al. | |

FOREIGN PATENT DOCUMENTS

| | | |
|---|---|---|
| EP | 0 841 144 A1 | 5/1998 |
| EP | 2 016 995 A1 | 1/2009 |
| JP | H1052819 A | 2/1998 |
| JP | 2000326389 A | 11/2000 |
| JP | 2011524285 A | 9/2011 |
| WO | 2007/101359 A2 | 9/2007 |
| WO | 2015025800 A1 | 2/2015 |

OTHER PUBLICATIONS

Shah, A. Comparison of the Flow in Co-rotating and Counter-rotating Twin-screw Extruders | Semantic Scholar. 2004, www.semanticscholar.org/paper/Comparision-of-the-flow-in-co-rotating-and-Shah-Gupta/5bd77002f35812386305f577cb220262ea56e02f. (Year: 2004).*

* cited by examiner

DEVICE AND METHOD FOR PRODUCING A DYED AND AN UNDYED PLASTIC MELT

CROSS REFERENCE TO RELATED APPLICATIONS

This application is a United States National Phase Application of International Application PCT/EP2017/068947 filed Jul. 27, 2017 and claims the benefit of priority under 35 U.S.C. § 119 of European patent application Serial No. EP 16 184 547.4 filed on Aug. 17, 2016, the entire contents of which are incorporated herein by reference.

FIELD OF THE INVENTION

The invention relates to a device and to a method for producing a dyed and an undyed plastic melt.

BACKGROUND OF THE INVENTION

A device and a method for producing plastic granulate from a plastic melt are known from DE 10 2004 002 401 A1. The plastic melt generated by means of a screw extruder is extruded in the form of plastic strands and is pelletized by means of an underwater pelletizing installation. A device of this type is used either exclusively for producing dyed plastic granulate or exclusively for producing undyed plastic granulate, thus plastic granulate of natural color. A selective production of dyed and undyed plastic granulate is not possible since a dyeing agent used in the production of a dyed plastic melt would contaminate a subsequently produced undyed plastic melt.

SUMMARY OF THE INVENTION

The invention is based on the object of achieving a device which in a simple, flexible and economical manner enables the selective production of a dyed and an undyed plastic melt.

This object is achieved by a device for producing a dyed and an undyed plastic melt, comprising a multi-shaft screw extruder for providing a plastic melt, having a housing; at least two mutually penetrating housing bores that are configured in the housing; a first infeed opening and a second infeed opening which open into the at least two housing bores; at least two treatment element shafts that are disposed so as to be rotatingly drivable in the housing bores; a first metering installation for feeding an undyed plastic material through the first infeed opening into the at least two housing bores; a second metering installation for feeding at least one dyeing agent through the second infeed opening into the at least two housing bores; and a control installation for selecting between a first operating mode for producing the dyed plastic melt and a second operating mode for producing the undyed plastic melt. It has been acknowledged according to the invention that the multi-shaft screw extruder in the region of the at least two housing bores and of the at least two treatment element shafts disposed therein has sufficient self-cleaning, but the feeding of the dyeing agent into the at least two housing bores has to be performed separately so as to avoid any contamination of the undyed plastic melt by residual dyeing agent. On account of the two separate infeed openings, the undyed plastic material for providing or producing, respectively, the undyed plastic melt and the dyeing agent for producing the dyed plastic melt are feed into the at least two housing bores in a strictly mutually separate manner. On account of the selection of the first operating mode or of the second operating mode by means of the control installation, the metering installations are actuated in such a manner that either the dyed plastic melt is capable of being produced in the first operating mode, or the undyed plastic melt is capable of being produced in the second operating mode. The metering installations 5 are thus capable of being operated in a mutually independent manner by means of the control installation. For example, the control installation is configured in such a manner that selectively the first metering installation is capable of being exclusively operated, or the second metering installation is capable of being exclusively operated, or both metering installations are capable of being conjointly operated.

In the first operating mode the undyed plastic material by means of the first metering installation and/or by means of the second metering installation is fed into the housing bores. Additionally, the dyeing agent by means of the second metering installation is fed through the second infeed opening into the housing bores. The dyed plastic melt comprises between 0.5% by weight and 10% by weight, in particular between 1% by weight and 6% by weight, and in particular between 1.5% by weight and 4% by weight dyeing agent, and between 90% by weight and 99.5% by weight, in particular between 94% by weight and 99% by weight, and in particular between 96% by weight and 98.5% by weight undyed plastic material. Additionally, other additives than the dyeing agent can be mixed with the dyed plastic melt, said additives not being considered in the weight proportions stated above. For example, in the first operating mode a first proportion of the plastic material is fed by means of the first metering installation, and a second proportion of the undyed plastic material is fed by means of the second metering installation, into the at least two housing bores. Additionally, the dyeing agent is mixed with the second proportion of the undyed plastic material and is fed through the second infeed opening. The first proportion or the second proportion can also be zero, such that the entire undyed plastic material in the first operating mode is fed through the second infeed opening or the first infeed opening. The undyed plastic material and the dyeing agent are present, for example, as bulk material, in particular as powder and/or granulate. The dyeing agent is present, for example, as masterbatch granulate, or color masterbatch granulate, or color granulate, respectively. The dyeing agent is carbon black, for example.

In the second operating mode, only the undyed plastic material by means of the first metering installation is fed through the first infeed opening into the at least two housing bores. The plastic material is configured, for example, as bulk material, in particular as powder and/or granulate.

On account of only a single multi-shaft screw extruder being required, the complexity in terms of machine technology is significantly reduced such that the selective production of the dyed and the undyed plastic melt is possible in a simple and economical manner. The at least two treatment element shafts are in particular rotatingly drivable in the same direction. The multi-shaft screw extruder is preferably configured as a dual-shaft screw extruder. When the undyed plastic melt is produced first, the subsequent production of the dyed plastic melt is possible in a simple, rapid and flexible manner since the dyed plastic melt is not contaminated by the undyed plastic melt. By contrast, when the dyed plastic melt is produced first, in order for the undyed plastic melt to be produced an impure plastic melt is thus initially produced in a transition period since the multi-shaft screw extruder carries out self-cleaning. The at least two treatment element shafts for self-cleaning are configured so as to mutually mesh in a tight manner and so as to scrape a housing internal wall. Once self-cleaning has been completed after the transition period, the undyed plastic melt is thus produced without any complex cleaning measures. The impure plastic melt that is discharged from the multi-shaft screw extruder in the transition period is pelletized, for example, and the impure plastic granulate generated is separated from the undyed plastic granulate generated and from the dyed plastic granulate generated. The device thus enables a selective production of the dyed and the undyed plastic melt in a simple, flexible and economical manner.

A device wherein the control installation is configured in such a manner that in the first operating mode at least the dyeing agent by means of the second metering installation is capable of being fed through the second infeed opening into the at least two housing bores, and the undyed plastic material is capable of being fed by means of at least one of the metering installations, and in the second operating mode the undyed plastic material by means of the first metering installation is capable of being fed through the first infeed opening into the at least two housing bores guarantees a simple selective production of the dyed and the undyed plastic melt. In the first operating mode the control installation actuates the second metering installation in such a manner that at least the dyeing agent required is fed through the second infeed opening into the at least two housing bores. In the first operating mode the undyed plastic material required is fed by means of at least one of metering installations, preferably by means of the first and the second metering installation. Additionally, other additives than the dyeing agent can be fed into the housing bores by means of at least one of the metering installations. In the second operating mode the control installation actuates the first metering installation in such a manner that the undyed plastic material required is fed exclusively through the first infeed opening into the at least two housing bores. In the second operating mode the second metering installation is actuated by the control installation in such a manner that neither any dyeing agent nor undyed plastic material is fed through the second infeed opening. The second metering installation in the second operating mode is preferably at least partially, in particular completely, deactivated.

A device configured such that the second metering installation comprises an infeed extruder which opens into the second infeed opening guarantees a simple, flexible and economical selective production of the dyed and the undyed plastic melt. On account of the second metering installation comprising an infeed extruder, the dyeing agent is fed into the at least two housing bores in a simple and flexible manner in a desired way.

A device wherein the infeed extruder is configured as a single-shaft mixing extruder which upstream thereof is assigned a dyeing agent metering unit and a plastic material metering unit guarantees a simple, flexible and economical production of the dyed plastic melt by means of pulverulent dyeing agent. The pulverulent dyeing agent and the pulverulent undyed plastic material are metered into the infeed extruder by way of a dyeing agent metering unit and a plastic material metering unit. The infeed extruder is configured as a single-shaft mixing extruder which generates a homogeneous mixture or powder mixture, respectively, from the dyeing agent and from the undyed plastic material. The mixture generated is fed through the second infeed opening into the at least two housing bores by means of the single-shaft mixing extruder. The single-shaft mixing extruder as well as the dyeing agent metering unit and the plastic material metering unit are preferably deactivated in the second operating mode.

A device wherein the infeed extruder is configured as a dual-shaft screw extruder which upstream thereof is assigned a masterbatch metering unit guarantees a simple, flexible and economical production of the dyed plastic melt by means of color masterbatch granulate. A granulate mixture from the dyeing agent and the plastic material is referred to as color masterbatch granulate. The dyeing agent is present in a concentrated form in the plastic material. The color masterbatch granulate hereunder is also referred to as color granulate. The color masterbatch granulate is fed to the infeed extruder by means of the masterbatch metering unit. The infeed extruder is configured as a dual-shaft screw extruder which feeds the color masterbatch granulate in a metered manner into the at least two housing bores. The dual-shaft screw extruder is in particular configured as a side-feeder screw extruder. The dual-shaft screw extruder is in particular rotatingly drivable in the same direction. The masterbatch metering unit is deactivated in the second operating mode. The dual-shaft screw extruder in the second operating mode is deactivated or operated empty. On account of the empty operation, the undyed plastic material, or the undyed plastic melt, respectively, that is present in the at least two housing bores is kept in the at least two housing bores. There is no contamination performed by virtue of the dual-shaft screw extruder since the dyeing agent is not bound in the color masterbatch granulate, and the dual-shaft screw extruder by virtue of self-cleaning is not contaminated with residual color masterbatch granulate. The dual-shaft screw extruder is configured so as to tightly mesh and so as to closely scrape a housing internal wall.

A device wherein the treatment element shafts therebetween configure a gap, and where a width $A_1$ of the gap in relation to an external diameter D of the treatment element shafts is: $0.003 \leq A_1/D \leq 0.05$, in particular $0.004 \leq A_1/D \leq 0.035$, and in particular $0.011 \leq A_1/D \leq 0.02$, guarantees a simple, flexible and economical selective production of the dyed and the undyed plastic melt. On account of the at least two treatment element shafts being configured so as to mutually mesh in a tight manner, said treatment element shafts in a simple manner are also self-cleaning.

A device wherein the treatment element shafts conjointly with a housing internal wall of the housing configure a gap, and where a width $A_2$ of the gap in relation to an external diameter D of the treatment element shafts is: $0.004 \leq A_2/D \leq 0.03$, in particular $0.005 \leq A_2/D \leq 0.025$, and in particular $0.012 \leq A_2/D \leq 0.019$, guarantees a simple, flexible and economical selective production of the dyed and the undyed plastic melt. On account of the at least two treatment element shafts scraping the housing internal wall, the latter in a simple manner is cleaned by the at least two treatment element shafts.

A device configured such that the second infeed opening in a conveying direction is disposed downstream of the first infeed opening guarantees a simple, flexible and economical selective production of the dyed and the undyed plastic melt. On account of the second infeed opening being disposed downstream of the first infeed opening, complete self-cleaning of the treatment element shafts and of the housing internal wall of the housing is possible in a simple manner by means of the undyed plastic material, or the undyed plastic melt, respectively. Moreover, the portion of the multi-shaft screw extruder that is contaminated by dyeing agent is as short as possible.

A device configured such that the at least two treatment element shafts comprise in each case one shaft, and screw elements are disposed so as to be rotationally fixed on the shafts between the infeed openings guarantees a simple selective production of the dyed and the undyed plastic melt. On account of screw elements as treatment elements being exclusively disposed so as to be rotationally fixed on the shafts between the infeed openings, the complexity in terms of machine technology is minor in the portion between the infeed openings. The undyed plastic material that is fed through the first infeed opening is conveyed by means of the screw elements only in one conveying direction to the second infeed opening. In the first operating mode dyeing agent and optionally undyed plastic material are fed in the desired manner through the second infeed opening. In the second operating mode no feeding of dyeing agent and undyed plastic material is performed through the second infeed opening.

A device configured such that the at least two treatment element shafts comprise in each case one shaft, and kneading elements are disposed so as to be rotationally fixed on the shafts between the infeed openings guarantees a simple, flexible and economical selective production of the dyed and the undyed plastic melt. On account of kneading elements being disposed so as to be rotationally fixed on the shafts between the infeed openings, the plastic material that is fed through the first infeed opening is already heated ahead of the second infeed opening and in particular at least partially or completed melted. In the first operating mode the addition thermal input required for melting and homogenizing the dyeing agent and optionally further plastic material downstream of the second infeed opening is minor. The complexity in terms of machine technology downstream of the second infeed opening is in particular minor on account thereof. The kneading elements can be configured as individual kneading disks and/or as kneading blocks. The respective kneading block comprises a plurality of integrally interconnected kneading disks.

A device configured such that the at least two treatment element shafts comprise in each case one shaft, and screw elements and kneading elements are disposed so as to be rotationally fixed on the shafts downstream of the infeed openings guarantees a simple, flexible and economical selective production of the dyed and the undyed plastic melt. The screw elements and the kneading elements enable in a simple manner melting of the plastic material and/or homogenizing of the dyeing agent and the plastic material. The kneading elements can be configured as individual kneading disks and/or as kneading blocks. The respective kneading block comprises a plurality of integrally interconnected kneading disks.

A device comprising a closure element for closing the second infeed opening guarantees a simple and flexible selective production of the dyed and the undyed plastic melt. On account of the closure element it is prevented in the second operating mode that residual dyeing agent, for example by virtue of vibrations, makes its way through the second infeed opening into the at least two housing bores and contaminates the undyed plastic material, or the undyed plastic melt, respectively.

A device configured such that the closure element is activatable by means of a closure element drive guarantees a simple and flexible selective production of the dyed and the undyed plastic melt. The closure element is automatically activated by means of the closure element drive in the changeover from the first operating mode to the second operating mode, or from the second operating mode to the first operating mode. The closure element is disposed so as to be pivotable on the housing, for example, such that the closure element drive for opening and closing the second infeed opening pivots the closure element about a pivot axis. Furthermore, the closure element for opening and closing the second infeed opening is repositionable in a linear manner in at least one direction, for example by means of the closure element drive.

A device configured such that the closure element has a closure wall which is shaped so as to correspond to a housing internal wall and delimits at least one of the housing bores guarantees a simple production of the undyed plastic melt. Scraping of the closure wall in the second operating mode is guaranteed on account of the shape of the closure element. The closure wall on account of the shape thus does not form any undesirable dead spaces in which undyed plastic material, or undyed plastic melt, respectively, could accumulate in an undesirable manner. Depending on the arrangement of the closure element, the closure wall has the shape of a housing bore or of a plurality of housing bores, in particular of two housing bores.

The invention is furthermore based on the object of achieving a method which in a simple, flexible and economical manner enables the selective production of a dyed and an undyed plastic melt.

This object is achieved by a method for producing a dyed and an undyed plastic melt, comprising the following method steps: providing a multi-shaft screw extruder having a housing; at least two mutually penetrating housing bores that are configured in the housing; a first infeed opening and a second infeed opening which open into the at least two housing bores; at least two treatment element shafts that are disposed so as to be rotatingly drivable in the housing bores; providing a first metering installation and a second metering installation; selecting between a first operating mode for producing the dyed plastic melt and a second operating mode for producing the undyed plastic melt by means of a control installation, wherein in the first operating mode at least one dyeing agent by means of the second metering installation is fed through the second infeed opening into the at least two housing bores, and an undyed plastic material is fed by means of at least one of the metering installations; and in the second operating mode the undyed plastic material by means of the first metering installation is fed through the first infeed opening into the at least two housing bores; and operating the multi-shaft screw extruder and the metering installations in the selected operating mode. The advantages of the method according to the invention correspond to the already described advantages of the device according to the invention. The method can in particular also be refined by way of the features according to the inventive device.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
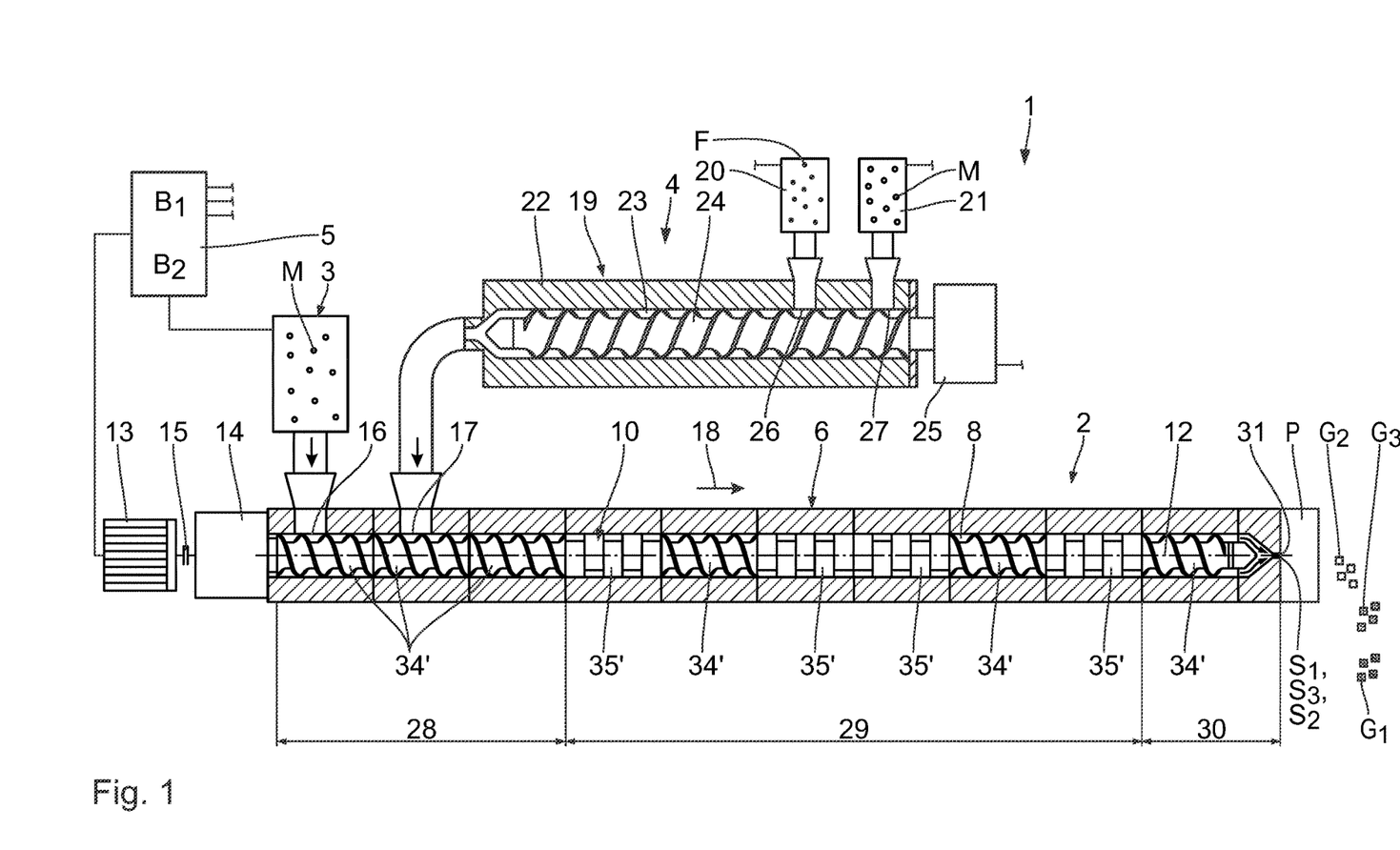
FIG. 1 is a partially sectional view of a device for producing a dyed and an undyed plastic melt according to a first exemplary embodiment.
Figure 2:
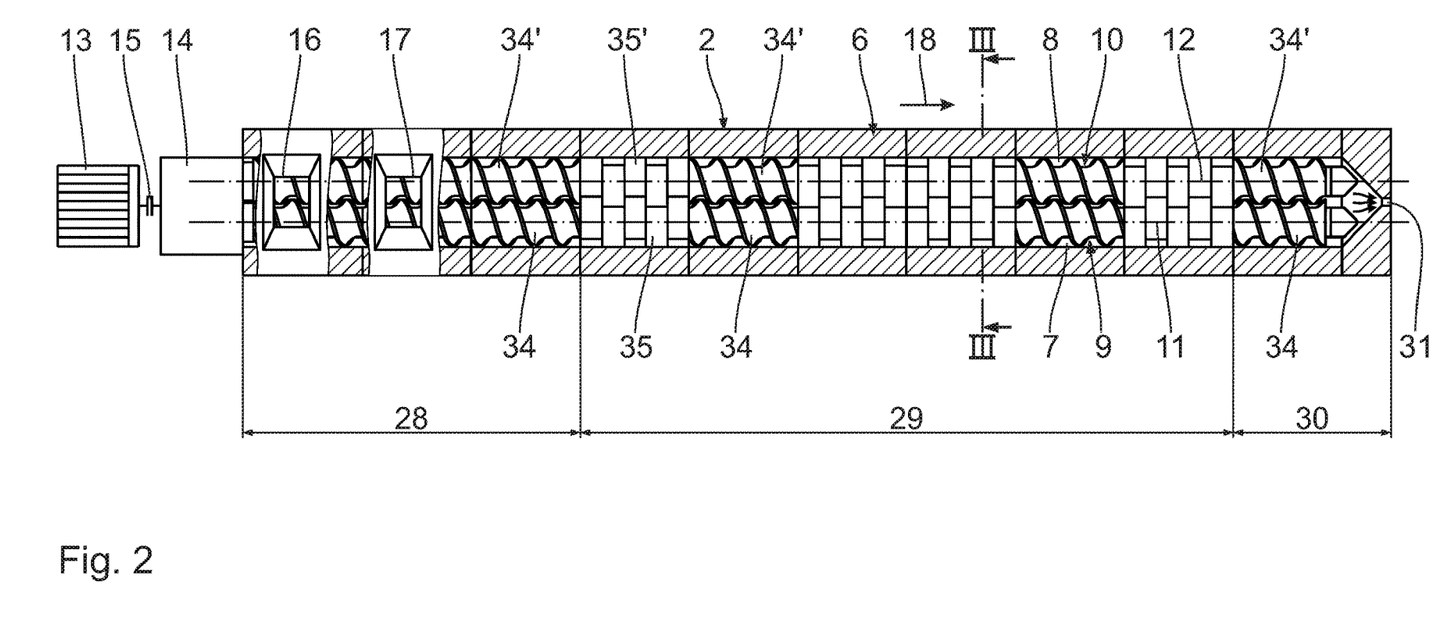
FIG. 2 is a partially sectional plan view of a multi-shaft screw extruder of the device in FIG. 1.
Figure 3:
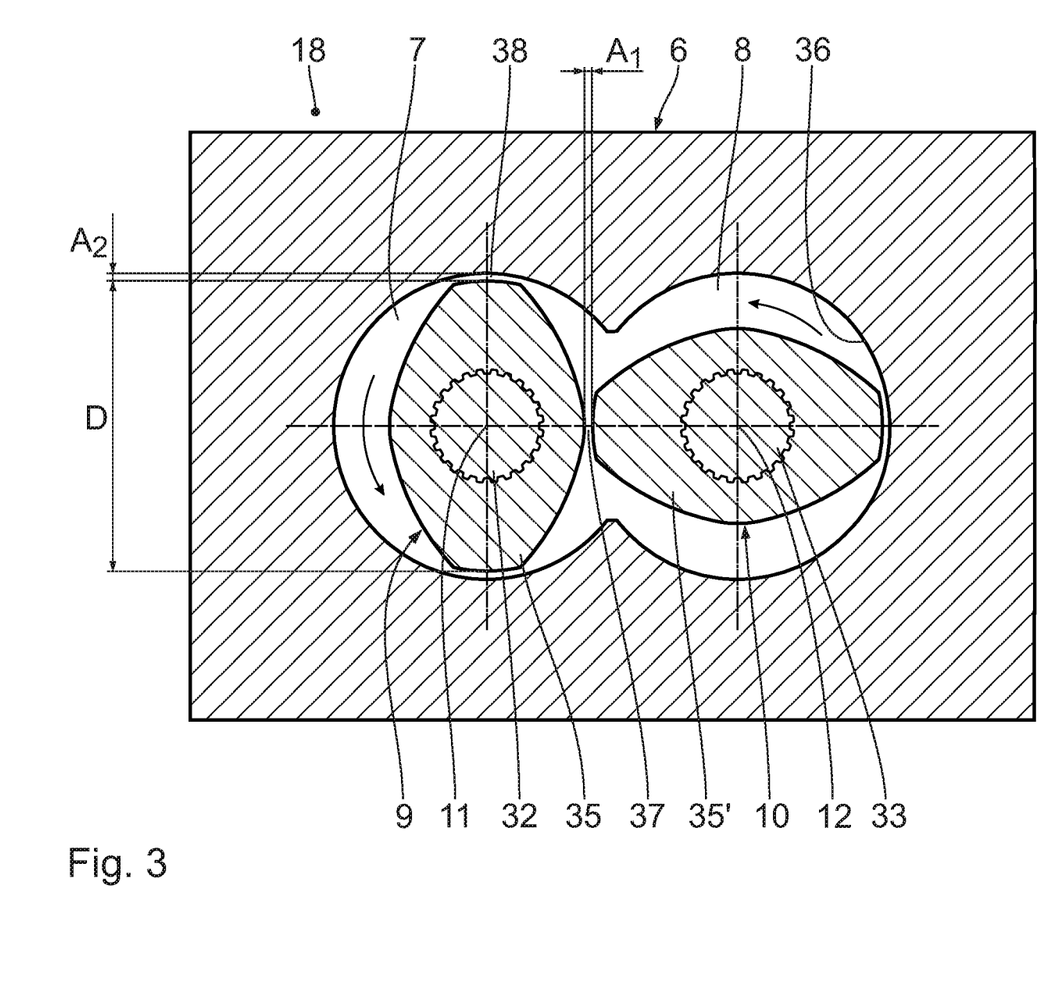
FIG. 3 is a sectional view of the multi-shaft screw extruder along a section line III-III in FIG. 2.

Referring to the drawings, A first exemplary embodiment of the invention is described hereunder by means of FIGS. 1 to 3. A device 1 for producing a dyed plastic melt $S_1$ and an undyed plastic melt $S_2$ comprises a multi-shaft screw extruder 2, a first metering installation 2, a second metering installation 4, and a control installation 5. The multi-shaft screw extruder 2 has a housing 6 in which two mutually penetrating housing bores 7, 8 are configured. Treatment element shafts 9, 10 are disposed so as to be rotatable about associated rotation axes 11, 12 in the housing bores 7, 8. The treatment element shafts 9, 10 by means of a drive motor 13, and by way of a transfer gearbox 14, are rotatably drivable in the same direction, thus in identical directions. A clutch 15 is disposed between the drive motor 13 and the transfer gearbox 14.

A first infeed opening 16 and a second infeed opening 17 which open into the housing bores 7, 8 are configured in the housing 6. The second infeed opening 17 in a conveying direction 18 is disposed downstream of the first infeed opening 16. The first metering installation 3 opens into the first infeed opening 16 and serves for feeding an undyed plastic material M through the first infeed opening 16 into the housing bores 7, 8. The first metering installation 3 is configured as a gravimetric metering unit, for example.

The second metering installation 4 comprises an infeed extruder 19, a dyeing agent metering unit 20, and a plastic material metering unit 21. The second metering installation 4, or the infeed extruder 19, respectively, opens into the second infeed opening 17. The undyed plastic material M and/or a dyeing agent F is capable of being fed through the second infeed opening 17 into the housing bores 7, 8 by means of the second metering installation 4.

The infeed extruder 19 is configured as a single-shaft mixing extruder. The infeed extruder 19 comprises a housing 22 having a housing bore 23 in which a mixing shaft 24 is rotatably disposed. The mixing shaft 24 is rotatably drivable by means of a drive motor 25. The dyeing agent metering unit 20 and the plastic material metering unit 21 which open into the housing bore 23 are disposed upstream of the infeed extruder 19. To this end, a dyeing agent infeed opening 26 and a plastic material infeed opening 27 are configured in the housing 22, for example. The dyeing agent metering unit 20 serves for metering the dyeing agent F into the infeed extruder 19. Accordingly, the plastic material metering unit 20 serves for metering the undyed plastic material M into the infeed extruder 19. The metering units 20, 21 are configured as gravimetric metering units, for example.

The screw extruder 2 in the conveying direction 18 has in succession a drawing-in zone 28, a melting and mixing zone 29, and a discharge zone 30. The housing 6 at the end side of the discharge zone 30 has a discharge opening 31. The infeed openings 16, 17 are disposed in the drawing-in zone 28. The treatment element shafts 9, 10 comprise in each case an associated shaft 32, 33, screw elements 34, 34' and kneading elements 35, 35' in succession in the conveying direction 18 being disposed in pairs so as to be rotationally fixed on said shafts 32, 33. Screw elements 34, 34' are exclusively disposed so as to be rotationally fixed on the shafts 32, 33 in the drawing-in zone 28. Screw elements 34, 34' and kneading elements 35, 35' are disposed so as to be rotationally fixed on the shafts 32, 33 in the melting and mixing zone 29. Screw elements 34, 34' are in turn exclusively disposed so as to be rotationally fixed on the shafts 32, 33 in the discharge zone 30. The kneading elements 35, 35' are configured, for example, as individual kneading disks and/or as kneading blocks having a plurality of integrally interconnected kneading disks.

The treatment element shafts 9, 10 are configured so as to mutually mesh in a tight manner and so as to scrape a housing internal wall 36 of the housing 6. To this end, the treatment element shafts 9, 10 are mutually disposed in such a manner that a gap 37 delimited by the treatment element shafts 9, 10, when viewed in the cross section, has a width $A_1$, where the width $A_1$ in relation to an external diameter D of the treatment element shafts 9, 10 is: $0.003 \leq A_1/D \leq 0.05$, in particular $0.004 \leq A_1/D \leq 0.035$, and in particular $0.011 \leq A_1/D \leq 0.02$.

Furthermore, the treatment element shafts 9, 10, conjointly with the housing internal wall 36, form a respective gap 38 which, when viewed in the cross section, has an associated width $A_2$, where the width $A_2$ to external diameter D ratio is: $0.004 \leq A_2/D \leq 0.03$, in particular $0.005 \leq A_2/D \leq 0.025$, and in particular $0.012 \leq A_2/D \leq 0.019$.

The control installation 5 serves for selecting between a first operating mode $B_1$ for producing the dyed plastic melt $S_1$ and a second operating mode $B_2$ for producing the undyed plastic melt $S_2$. To this end, the control installation 5 in terms of signaling is connected to the multi-shaft screw extruder 2, the first metering installation 3, and the second metering installation 4. The control installation 5 is configured in such a manner that in the first operating mode $B_1$ at least the dyeing agent F by means of the second metering installation 4 is capable of being fed through the second infeed opening 17 into the at least two housing bores 7, 8, and the undyed plastic material M by means of the first metering installation 3 and/or the second metering installation 4 is capable of being fed through the first infeed opening 16 and/or the second infeed opening 17. The control installation 5 is furthermore configured in such a manner that in the second operating mode $B_2$ the undyed plastic material M by means of the first metering installation 3 is capable of being fed through the first infeed opening 16 into the at least two housing bores. No dyeing agent F is capable of being fed into the housing bores 7, 8 in the second operating mode $B_2$.

The functioning mode of the device 1 is as follows:

A selection between the first operating mode $B_1$ and the second operating mode $B_2$ is possible by means of the control installation 5. The production of the dyed plastic melt $S_1$ is performed in the first operating mode $B_1$, whereas the production of the dyed plastic melt $S_2$ is performed in the second operating mode $B_2$.

The undyed plastic material M and the dyeing agent F are fed to the multishaft screw extruder 2 in the first operating mode B1. The undyed plastic material M and the dyeing agent F in the drawing-in zone 28 make their way into the housing bores 7, 8 and are conveyed in the conveying direction 18 into the melting and mixing zone 29. The plastic material M is melted and the dyeing agent F is mixed with the melted plastic material M in the melting and mixing zone 29 such that the dyed plastic melt S1 is created. The dyed plastic melt S1 is subsequently discharged through the discharge opening 31 in the discharge zone 30. The dyed plastic melt S1 is subsequently pelletized in the usual manner, and dyed plastic granulate G1 is generated, for example. Moreover, the undyed plastic melt S2 is pelletized to generate an undyed plastic granulate G2 and an impure plastic melt S3 is pelletized to generate an impure plastic granulate G3.

The undyed plastic material M, thus the plastic material M of natural color, is a bulk material and is configured so as to be pulverulent and/or in the shape of granulate, for example. Accordingly, the dyeing agent F is present as bulk material and is configured so as to be pulverulent and/or in the shape of granulate, for example. The dyeing agent F is pulverulent carbon black, for example. The dyed plastic melt $S_1$ comprises between 0.5% by weight and 10% by weight, in particular between 1% by weight and 6% by weight, and in particular between 1.5% by weight and 4% by weight dyeing agent F, and between 90% by weight and 99.5% by weight, in particular between 94% by weight and 99% by weight, and in particular between 96% by weight and 98.5% by weight undyed plastic material M. Additionally, other additives than the dyeing agent F can be mixed with the dyed plastic melt $S_1$, said additives not being considered in the weight proportions stated above.

In a first variant of the operating mode $B_1$ the undyed plastic material M is fed both by means of the first metering installation 3 as well as by means of the second metering installation 4. The undyed plastic material M is fed through the first infeed opening 16 into the housing bores 7, 8 by means of the first metering installation 3. Between 40% by weight and 90% by weight, in particular between 45% by weight and 85% by weight, and in particular between 50% by weight and 80% by weight, of the entire undyed plastic material M is fed by means of the first metering installation 3. The residual undyed plastic material M by means of the plastic material metering unit 21, and the dyeing agent F by means of the dyeing agent metering unit 20 are fed into the infeed extruder 19 and mixed with one another therein. To this end, the mixing shaft 24 is rotatingly driven at a rotating speed between 200 rpm and 3500 rpm, in particular between 350 rpm and 3000 rpm, and in particular between 500 rpm and 2500 rpm. The mixture from the undyed plastic material M and the dyeing agent F is fed into the housing bores 7, 8 by way of the second infeed opening 17.

In the case of a second variant of the operating mode $B_1$, the second metering installation 4 is exclusively operated and the entire undyed plastic material M by means of the plastic material metering unit 21, and the dyeing agent F by means of the dyeing agent metering unit 20 are fed to the infeed extruder 19. The mixture generated from the entire plastic material M and the dyeing agent F is fed into the housing bores 7, 8 by way of the second infeed opening 17.

In the case of a third variant of the first operating mode $B_1$, the entire undyed plastic material M by means of the first metering installation 3 is fed by way of the first infeed opening 16, and the dyeing agent F is fed exclusively by way of the second infeed opening 17.

The second metering installation 4 is deactivated when the second operating mode $B_2$ is subsequently selected by means of the control installation 5. In order for the undyed plastic melt $S_2$, thus the plastic melt $S_2$ of natural color, to be produced the multi-shaft screw extruder 2 is fed the undyed plastic material M exclusively by means of the first metering installation 3. No dyeing agent F is fed in the second operating mode $B_2$. Self-cleaning of the multi-shaft screw extruder 2 takes place in a transition period after the changeover. Residual dyeing agent F which is located in the housing bores 7, 8, in particular on the treatment element shafts 9, 10 and on the housing internal wall 36, by virtue of the tightly meshing configuration of the treatment element shafts 9, 10 and of the scraping of the housing internal wall 36 by means of the treatment element shafts 9, 10, is removed from the multi-shaft screw extruder 2. An impure plastic melt $S_3$ which is capable of being utilized neither as dyed plastic melt S nor as undyed plastic melt $S_2$ is created in said transition period, said impure plastic melt $S_3$ therefore having to be separated. The self-cleaning is completed after the transition period such that the undyed plastic melt $S_2$ is generated in the desired manner in that the plastic material M that is fed through the first infeed opening 16 is conveyed to the melting and mixing zone 29 and therein is melted and subsequently discharged in the discharge zone 30.

A changeover from the second operating mode $B_2$ to the first operating mode $B_1$ is possible in a simple manner since no self-cleaning of the multi-shaft screw extruder 2 is required for producing the dyed plastic melt $S_1$.

Figure 4:
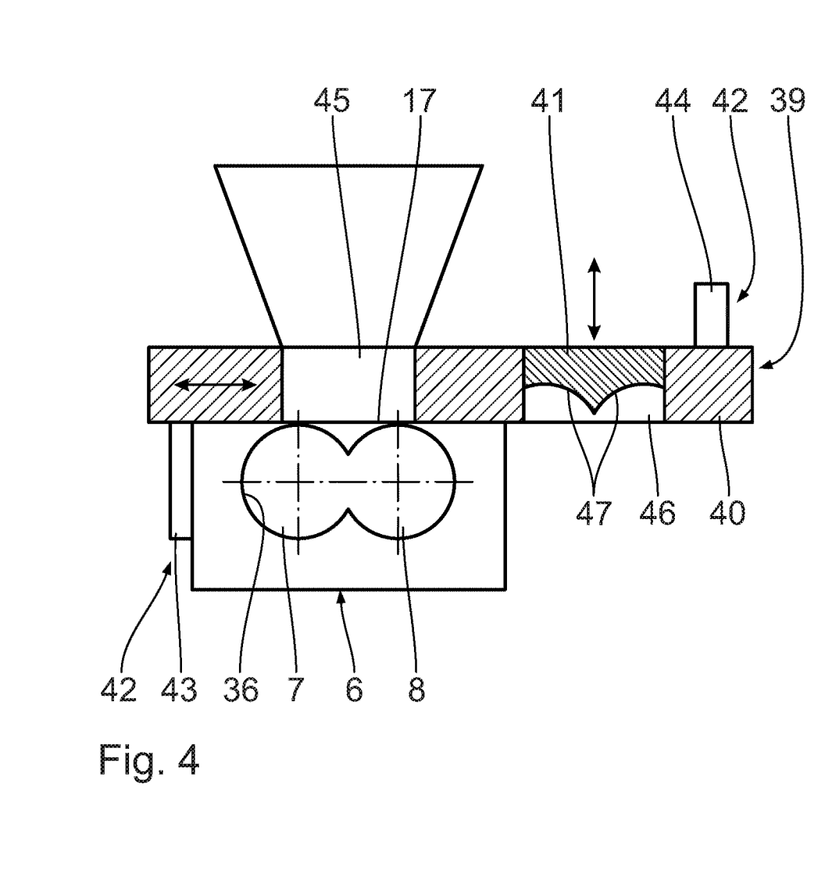
FIG. 4 is a sectional view in the region of a second infeed opening of the multi-shaft screw extruder of a device according to a second exemplary embodiment.

A second exemplary embodiment of the invention is described hereunder by means of FIG. 4. As opposed to the preceding exemplary embodiment, the device 1 has a closure element 39 which closes the second infeed opening 17 in the second operating mode $B_2$ and opens said second infeed opening 17 in the first operating mode $B_1$. The closure element 39 comprises a support component 40, a closure component 41, and a closure element drive 42 having a first drive motor 43 and a second drive motor 44. The support component 40 has two passage openings 45, 46, wherein the closure component 41 is disposed so as to be repositionable in the passage opening 46. The support component 40 by means of the first drive motor 42 is repositionable in a horizontal direction such that either the free passage opening 45 or the passage opening 46 that is provided with the closure component 41 is aligned with the second infeed opening 17. In the first operating mode $B_1$, the support component 40 by means of the drive motor 43 is repositioned such that the free passage opening 45 is aligned with the second infeed opening 17 such that the infeed through the second infeed opening 17 into the housing bores 7, 8 is possible. In the transition to the second operating mode $B_2$ the support component 40 by means of the first drive motor 43 is repositioned in the horizontal direction such that the passage opening 46 is aligned with the second infeed opening 17. The closure component 41 by means of the second drive motor 44 is subsequently repositioned in a vertical direction such that the second infeed opening 17 is closed by the closure component 41. The closure component 41 has a closure wall 47 which is shaped so as to correspond to the housing internal wall 36 and to complement the housing internal wall 36 in the region of the second infeed opening 17 such that the housing bores 7, 8 are delimited by the housing 6 and the closure component 41. In the second operating mode $B_2$, no residual dyeing agent F can make its way into the housing bores 7, 8 through the second infeed opening 17, for example by virtue of vibrations. In the transition to the first operating mode B1 the closure component 41 and the support component 40 are repositioned in the reverse order. Reference in terms of the further construction and of the further functional mode is made to the first exemplary embodiment.

Figure 5:
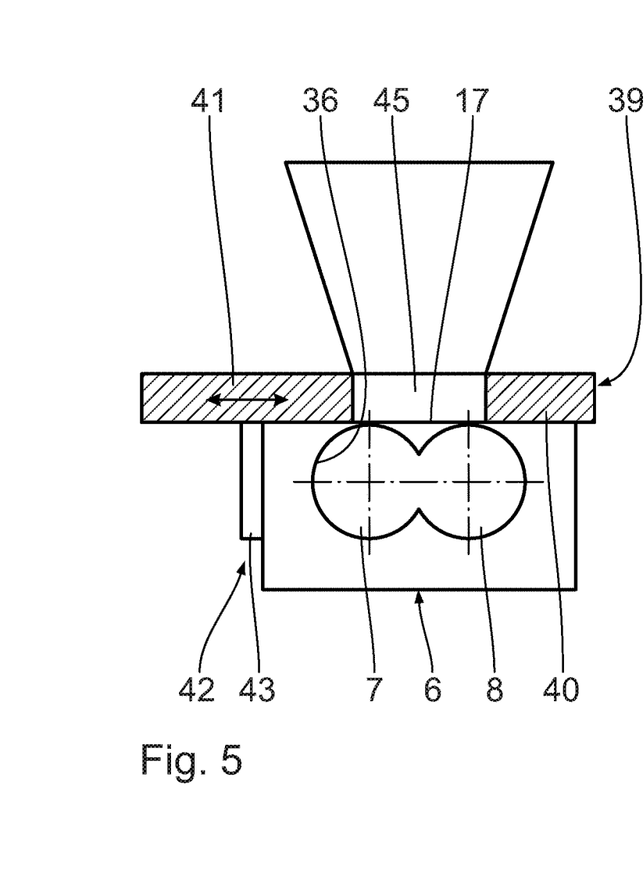
FIG. 5 is a sectional view in the region of a second infeed opening of the multi-shaft screw extruder of a device according to a third exemplary embodiment.

A third exemplary embodiment of the invention is described hereunder by means of FIG. 5. As opposed to the preceding exemplary embodiment, the support component 40 has only the first passage opening 45, and by way of a region laterally beside the passage opening 45 configures the closure component 41. In order for the second infeed opening 17 to be closed and opened, the support component 40 by means of the drive motor 43 is laterally repositioned in the horizontal direction such that either the closure component 41 or the passage opening 45 is disposed above the second infeed opening 17. Reference in terms of the further construction and of the further functional mode is made to the preceding exemplary embodiments.

Figure 6:
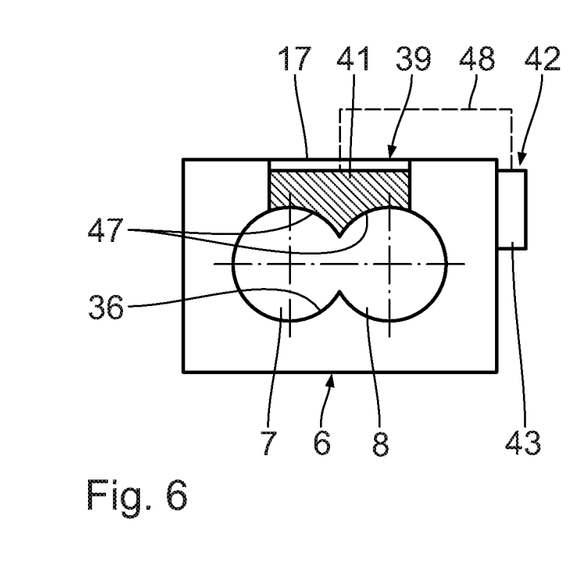
FIG. 6 is a sectional view in the region of a second infeed opening of the multi-shaft screw extruder of a device according to a fourth exemplary embodiment.

A fourth exemplary embodiment of the invention is described hereunder by means of FIG. 6. The closure element 39 comprises a guide 48 by means of which the closure component 41 is repositionable in a guided manner into the second infeed opening 17. The guide 48 is only schematically indicated in FIG. 6. The guide 48 can be configured in an arbitrary manner, for example as a pivot joint. In order for the second infeed opening 17 to be opened and closed, the closure component 41 by means of the drive motor 43 is repositioned along the guide 48. Reference in terms of the further construction and of the further functional mode is made to the preceding exemplary embodiments.

Figure 7:
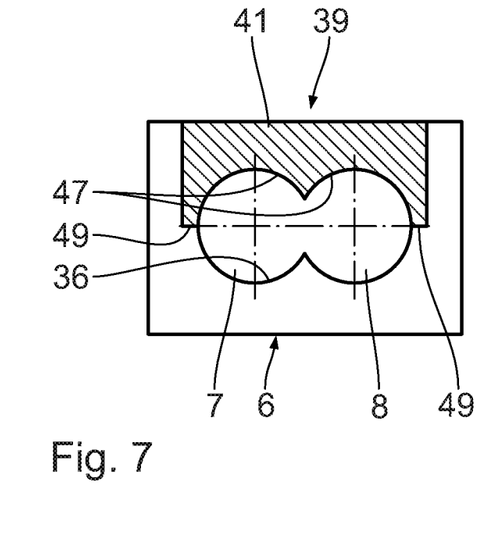
FIG. 7 is a sectional view in the region of a second infeed opening of the multi-shaft screw extruder of a device according to a fifth exemplary embodiment.

A fifth exemplary embodiment of the invention is described hereunder by means of FIG. 7. The closure component 41 is manually assembled for closing the second infeed opening 17, and is manually disassembled for opening the second infeed opening 17. The housing 6 in the region of the second infeed opening 17 configures a detent 49 for the closure component 41 such that the latter in the assembled state is exactly positioned. Reference in terms of the further construction and of the further functional mode is made to the preceding exemplary embodiments.

Figure 8:
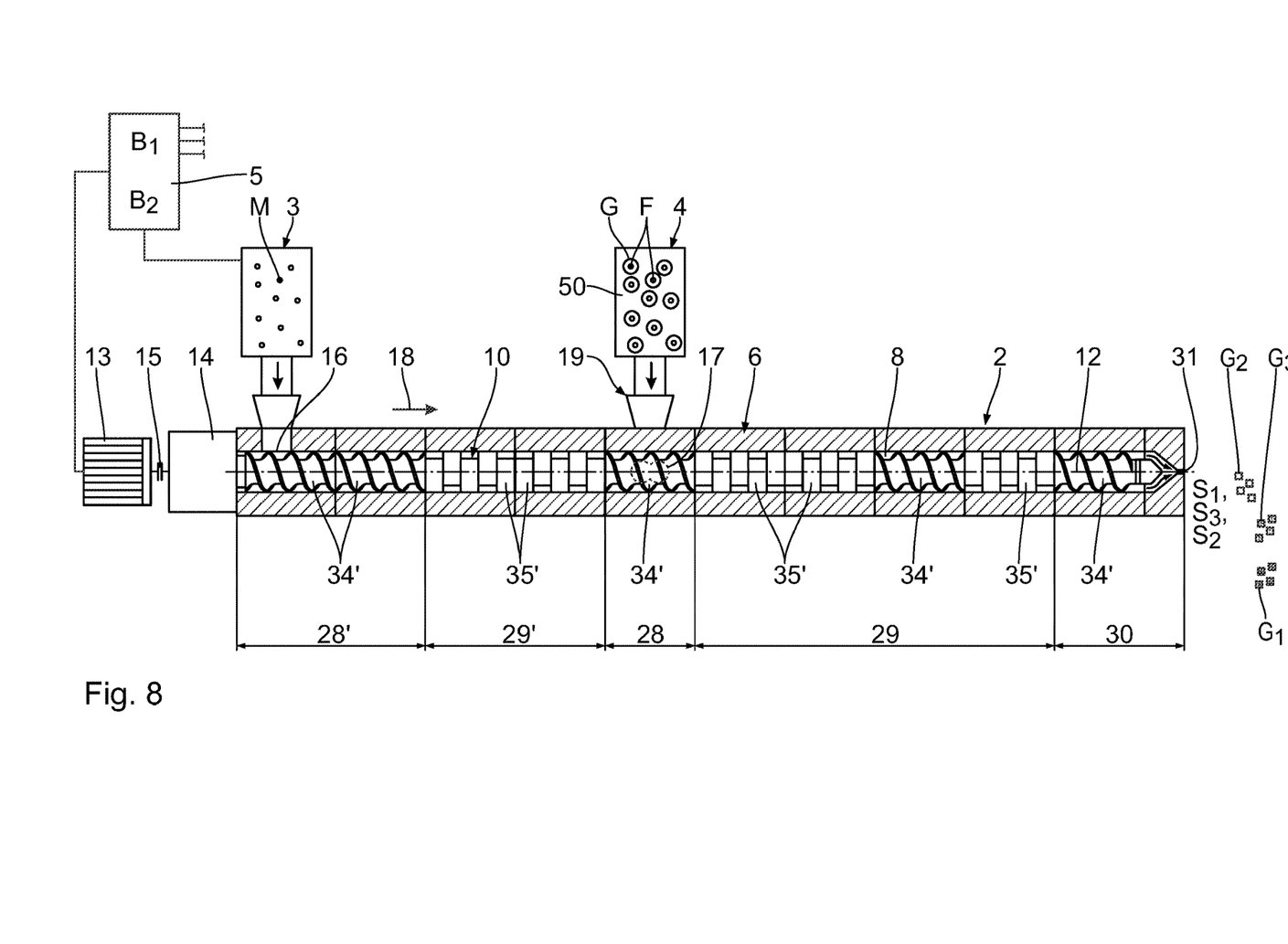
FIG. 8 is a partially sectional view of a device for producing a dyed and an undyed plastic melt according to a sixth exemplary embodiment.
Figure 9:
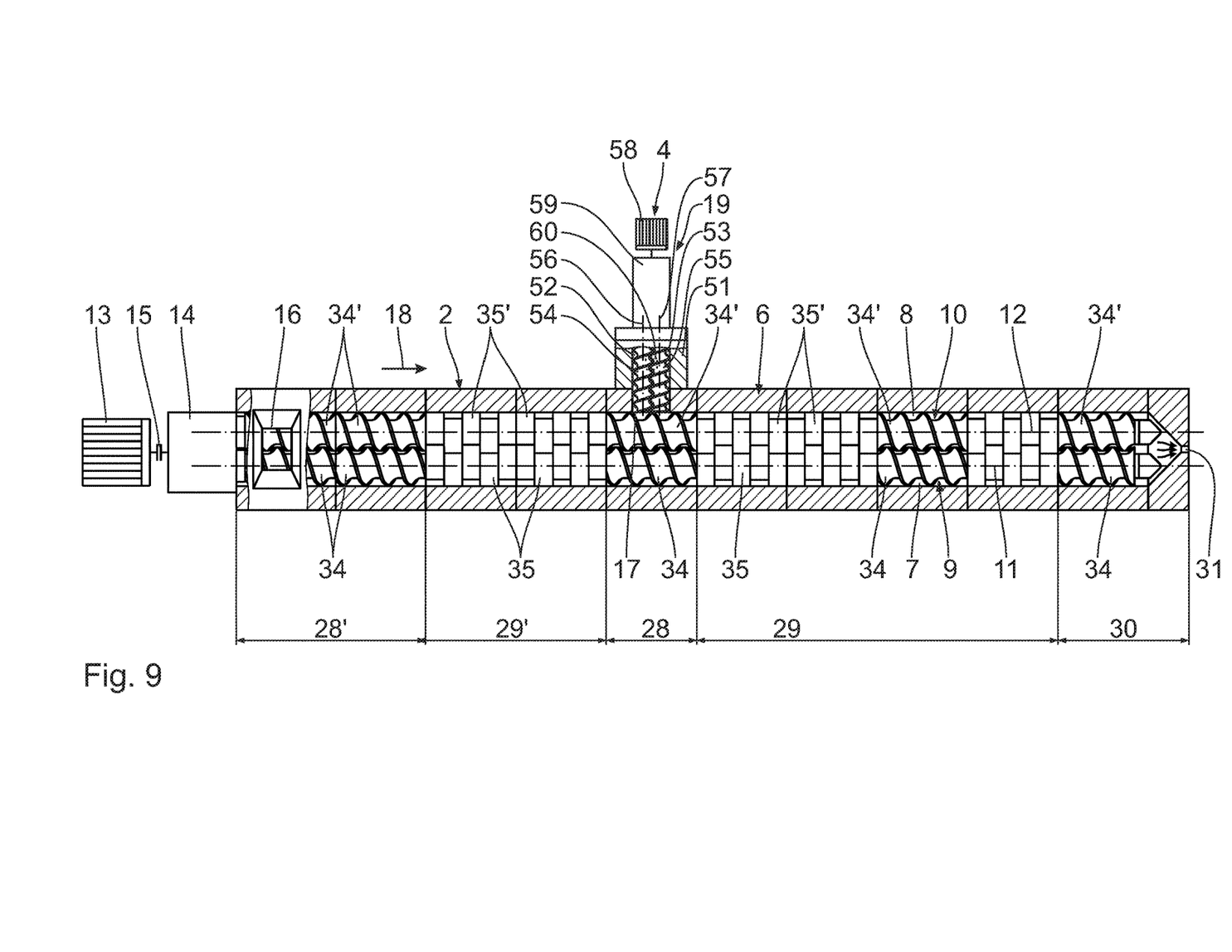
FIG. 9 is a partially sectional plan view of a multi-shaft screw extruder of the device in FIG. 8.

A sixth exemplary embodiment of the invention is described hereunder by means of FIGS. 8 and 9. As opposed to the preceding exemplary embodiments, the second metering installation 4 has a masterbatch metering unit 50 which is disposed upstream of the infeed extruder 19. The infeed extruder 19 is configured as a dual-shaft screw extruder. Said infeed extruder 19 comprises a housing 51 having two mutually penetrating housing bores 52, 53 configured therein, two screw shafts 54, 55 being disposed in said housing bores 52, 53 so as to be rotatable about associated rotation axes 56, 57. The screw shafts 54, 55 by means of a drive motor 58, and by way of a transfer gearbox 59, are rotatingly driven in the same direction, thus in identical rotation directions. An infeed opening 60 into which the masterbatch metering unit 50 opens is configured in the housing 51.

The multi-shaft screw extruder 2 in the conveying direction 18 configures in succession a first drawing-in zone 28', a melting zone 29', a second drawing-in zone 28, the melting and mixing zone 29, and the discharge zone 30. Screw elements 34, 34' are exclusively disposed so as to be rotationally fixed on the shafts 32, 33 in the region of the first drawing-in zone 28'. By contrast, kneading elements 35, 35' are in turn exclusively disposed so as to be rotationally fixed on the shafts 32, 33 in the melting zone 29'. The second infeed opening 17 is configured so as to be downstream of the first infeed opening 16 in the second drawing-in zone 28. The melting zone 29' is thus disposed between the first infeed opening 16 and the second infeed opening 17. Accordingly, screw elements 34, 34' and kneading elements 35, 35' are disposed so as to be rotationally fixed on the shafts 32, 33 between the infeed openings 16, 17. The second infeed opening 17 is configured laterally in the housing 6. The infeed extruder 19 is configured as a dual-shaft side-feeder screw extruder.

In the first operating mode $B_1$ the undyed plastic material M by means of the first metering installation 3 is fed through the first infeed opening 16 into the first drawing-in zone 28'. The plastic material M is conveyed to the melting zone 29' and melted therein by means of the kneading elements 35, 35'. In the second drawing-in zone 28, color masterbatch granulate G is fed to the molten plastic material M by means of the second metering installation 4. The masterbatch granulate G comprises plastic material M and bound dyeing agent F which is present in a concentrated form in the masterbatch granulate G. The masterbatch granulate G by means of the masterbatch metering unit 50 is fed into the infeed extruder 19 and by means of the latter is fed through the second infeed opening 17 into the housing bores 7, 8. The masterbatch granulate G is melted in the melting and mixing zone 29 and is homogenized conjointly with the plastic material M that is present as a melt. The dyed plastic melt $S_1$ is subsequently discharged in the discharge zone 30. The dyed plastic melt $S_1$ comprises between 0.5% by weight and 10% by weight, in particular between 1% by weight and 6% by weight, and in particular between 1.5% by weight and 4% by weight dyeing agent F, and between 90% by weight and 99.5% by weight, in particular between 94% by weight and 99% by weight, and in particular between 96% by weight and 98.5% by weight undyed plastic material M. Additionally, other additives than the dyeing agent F can be mixed with the dyed plastic melt $S_1$, said additives not being considered in the weight proportions stated above.

No dyeing agent F, or no masterbatch granulate G, respectively, is fed by means of the second metering installation 4 in the second operating mode $B_2$. The second metering installation 4 is deactivated and the infeed extruder 19 is disassembled in a first variant of the second operating mode $B_2$. The second infeed opening 17 is closed by means of a closure element or a closure component, respectively. Since the second infeed opening 17 is configured laterally, the closure wall is shaped according to a housing bore 7 or 8, respectively, and delimits the latter. The exemplary embodiments according to FIGS. 4 to 7 can be applied in an analogous manner to the present exemplary embodiment. The undyed plastic material M by means of the first metering installation 3 is subsequently fed through the first infeed opening 16 and melted in the melting zone 29' such that self-cleaning is carried out in the transition period by means of the molten plastic material M in the second drawing-in zone 28, in the melting and mixing zone 29, and in the discharge zone 30. The undyed plastic melt $S_2$ is produced after self-cleaning. The masterbatch metering unit 50 is deactivated and the infeed extruder 19 is operated empty in a second variant of the second operating mode $B_2$, such that the molten plastic material M in the second drawing-in zone 28 is kept in the housing bores 7, 8 by the screw shafts 54, 55. Disassembling the infeed extruder 19 is not required in the case of the second variant. Reference in terms of the further construction and of the further functional mode is made to the preceding exemplary embodiments.

The device 1 according to the invention enables the selective production of a dyed plastic melt $S_1$ and an undyed plastic melt $S_2$ by way of only a single multi-shaft screw extruder 2. The complexity in terms of machine technology is comparatively minor on account thereof. When the first operating mode $B_1$ is changed over to the second operating mode $B_2$, an impure plastic melt $S_3$ is thus created during self-cleaning in a transition period. The impure plastic granulate produced therefrom, depending on the economics, is sold or in a subsequent production of the dyed plastic melt S is re-fed to the multi-shaft screw extruder 2 by way of the second infeed opening 17 and is further processed. The device 1 thus enables a simple, flexible and economical production selectively of a dyed plastic melt $S_1$ and an undyed plastic melt $S_2$.

While specific embodiments of the invention have been shown and described in detail to illustrate the application of the principles of the invention, it will be understood that the invention may be embodied otherwise without departing from such principles.

The invention claimed is:

1. A device for selectively producing a dyed plastic granulate from a dyed plastic melt and an undyed plastic granulate from an undyed plastic melt, the device comprising:
   a multi-shaft screw extruder for providing a plastic melt, the multi-shaft screw extruder having a housing, a first infeed opening, a second infeed opening, at least two treatment element shafts and at least two mutually penetrating housing bores configured in the housing, both the first infeed opening and the second infeed opening configured to open into the at least two mutually penetrating housing bores, the at least two treatment element shafts being rotatingly drivable in the at least two mutually penetrating housing bores;
   a first metering installation for feeding an undyed plastic material through the first infeed opening into the at least two mutually penetrating housing bores;
   a second metering installation for feeding at least one dyeing agent through the second infeed opening into the at least two mutually penetrating housing bores; and
   a control installation for selecting between a first operating mode for producing the dyed plastic melt which is pelletized to generate the dyed plastic granulate and a second operating mode for producing the undyed plastic melt which is pelletized to generate the undyed plastic granulate;
   wherein a first gap is defined between the at least two treatment element shafts, and a width of the first gap in relation to an external diameter of the at least two treatment element shafts is equal to or greater than 0.003 and equal to or less than 0.05 for achieving a self-cleaning of the at least two treatment element shafts; and
   wherein the at least two treatment element shafts and a housing internal wall of the housing define a second gap, and a width of the second gap in relation to the external diameter of the at least two treatment element shafts is equal to or greater than 0.004 and equal to or less than 0.03 for achieving a cleaning of the housing internal wall.

2. The device as claimed in claim 1, wherein the control installation is configured such that:
   in the first operating mode at least the dyeing agent is capable of being fed through the second infeed opening into the at least two mutually penetrating housing bores via the second metering installation, and the undyed plastic material is capable of being fed via at least one of the first metering installation and the second metering installation;
   in the second operating mode the undyed plastic material is capable of being fed through the first infeed opening into the at least two mutually penetrating housing bores via the first metering installation.

3. The device as claimed in claim 1, wherein the second metering installation comprises an infeed extruder which opens into the second infeed opening.

4. The device as claimed in claim 3, wherein the infeed extruder is configured as a single-shaft mixing extruder, the single-shaft mixing extruder being assigned a dyeing agent metering unit and a plastic material metering unit upstream of the single-shaft mixing extruder.

5. The device as claimed in claim 3, wherein the infeed extruder is configured as a dual-shaft screw extruder, the dual-shaft screw extruder being assigned a masterbatch metering unit upstream of the dual-shaft screw extruder.

6. The device as claimed in claim 1, wherein the second infeed opening is disposed downstream of the first infeed opening in a conveying direction.

7. The device as claimed in claim 6, wherein each of the at least two treatment element shafts comprises one shaft to provide at least a plurality of shafts, and screw elements are rotationally fixed on the shafts between the first infeed opening and the second infeed opening.

8. The device as claimed in claim 6, wherein each of the at least two treatment element shafts comprises one shaft to provide at least a plurality of shafts, and kneading elements are rotationally fixed on the shafts between the first infeed opening and the second infeed opening.

9. The device as claimed in claim 1, wherein each of the at least two treatment element shafts comprises one shaft to provide at least a plurality of shafts, and screw elements and kneading elements are rotationally fixed on the shafts downstream of the first infeed opening and the second infeed opening.

10. The device as claimed in claim 1, further comprising a closure element for closing the second infeed opening.

11. The device as claimed in claim 10, wherein the closure element is activatable via a closure element drive.

12. The device as claimed in claim 10, wherein the closure element has a closure wall, the closure wall being shaped to correspond to a housing internal wall and the closure wall defining at least one of the at least two mutually penetrating housing bores.

13. A method for selectively producing a dyed plastic granulate from a dyed plastic melt and an undyed plastic granulate from an undyed plastic melt, the method comprising the following method steps:
   providing a device for selectively producing the dyed plastic granulate from the dyed plastic melt and the undyed plastic granulate from the undyed plastic melt, the device comprising:
   a multi-shaft screw extruder for providing a plastic melt, the multi-shaft screw extruder having a housing, a first infeed opening, a second infeed opening, at least two treatment element shafts and at least two mutually penetrating housing bores configured in the housing, both the first infeed opening and the second infeed opening configured to open into the at least two mutually penetrating housing bores, the at least two treatment element shafts being rotatingly drivable in the at least two mutually penetrating housing bores;

first metering installation for feeding an undyed plastic material through the first infeed opening into the at least two mutually penetrating housing bores;
a second metering installation for feeding at least one dyeing agent through the second infeed opening into the at least two mutually penetrating housing bores; and
a control installation for selecting between a first operating mode for producing the dyed plastic melt which is pelletized to generate the dyed plastic granulate and a second operating mode for producing the undyed plastic melt which is pelletized to generate the undyed plastic granulate;
wherein a first gap is defined between the at least two treatment element shafts, and a width of the first gap in relation to an external diameter of the at least two treatment element shafts is equal to or greater than 0.003 and equal to or less than 0.05 for achieving a self-cleaning of the at least two treatment element shafts: and wherein the at least two treatment element shafts and a housing internal wall of the housing define a second gap, and a width of the second gap in relation to the external diameter of the at least two treatment element shafts is equal to or greater than 0.004 and equal to or less than 0.03 for achieving a cleaning of the housing internal wall;
selecting between the first operating mode for producing the dyed plastic granulate from the dyed plastic melt and the second operating mode for producing the undyed plastic granulate from the undyed plastic melt via the control installation, wherein in the first operating mode at least one dyeing agent is fed through the second infeed opening into the at least two mutually penetrating housing bores via the second metering installation, and an undyed plastic material is fed via at least one of the first metering installation and the second metering installation, wherein in the second operating mode the undyed plastic material is fed through the first infeed opening into the at least two mutually penetrating housing bores via the first metering installation; and
operating the multi-shaft screw extruder, the first metering installation and the second metering installations in a selected operating mode.

14. The device as claimed in claim 1, wherein the width of the first gap between the at least two treatment element shafts in relation to the external diameter of the at least two treatment element shafts is equal to or greater than 0.004 and equal to or less than 0.035.

15. The device as claimed in claim 1, wherein the width of the first gap between the at least two treatment element shafts in relation to the external diameter of the at least two treatment element shafts is equal to or greater than 0.011 and equal to or less than 0.02.

16. The device as claimed in claim 1, wherein the width of the second gap between the at least two treatment element shafts and the housing internal wall in relation to the external diameter of the at least two treatment element shafts is equal to or greater than 0.005 and equal to or less than 0.025.

17. The device as claimed in claim 1, wherein the width of the second gap between the at least two treatment element shafts and the housing internal wall in relation to the external diameter of the least two treatment element shafts is equal to or greater than 0.012 and equal to or less than 0.019.

18. The device as claimed in claim 1, wherein the at least two treatment element shafts are rotatingly drivable in the same direction.

19. The device as claimed in claim 1, wherein the control installation is configured to perform a self-cleaning of the multi-shaft screw extruder in a transition period after the selection of the second operating mode.

20. The device as claimed in claim 1, wherein the control installation is configured such that in the first operating mode the dyed plastic granulate is generated from the dyed plastic melt, in the second operating mode the undyed plastic granulate is generated from the undyed plastic melt, and in a transition period between the first operating mode and the second operating mode an impure plastic melt is discharged from the multi-shaft screw extruder and an impure plastic granulate is generated from the impure plastic melt.

21. The device as claimed in claim 20, wherein the control installation is configured such that the impure plastic granulate is separated from the undyed plastic granulate and from the dyed plastic granulate by sequentially producing the dyed plastic granulate in the first operating mode, the impure plastic granulate in the transition period, and the undyed plastic granulate in the second operating mode.

22. The device as claimed in claim 1, wherein the first metering installation is configured to feed an undyed bulk plastic material through the first infeed opening into the at least two mutually penetrating housing bores.

23. The method as claimed in claim 13, wherein the at least two treatment element shafts are rotatingly drivable in the same direction.

24. The method as claimed in claim 13, wherein the control installation is configured to perform a self-cleaning of the multi-shaft screw extruder in a transition period after the selection of the second operating mode.

25. The method as claimed in claim 13, wherein the control installation is configured such that in the first operating mode the dyed plastic granulate is generated from the dyed plastic melt, in the second operating mode the undyed plastic granulate is generated from the undyed plastic melt, and in a transition period between the first operating mode and the second operating mode an impure plastic melt is discharged from the multi-shaft screw extruder and an impure plastic granulate is generated from the impure plastic melt.

26. The method as claimed in claim 25, wherein the control installation is configured such that the impure plastic granulate is separated from the undyed plastic granulate and from the dyed plastic granulate by sequentially producing the dyed plastic granulate in the first operating mode, the impure plastic granulate in the transition period, and the undyed plastic granulate in the second operating mode.

27. The method as claimed in claim 13, wherein the first metering installation is configured to feed an undyed bulk plastic material through the first infeed opening into the at least two mutually penetrating housing bores.

* * * * *